(12) United States Patent
Zhu et al.

(10) Patent No.: US 12,187,870 B2
(45) Date of Patent: Jan. 7, 2025

(54) ELECTRICALLY CONDUCTIVE POLYMER ADHESIVES WITH COMPLEX DIMENSIONAL FILTERS

(71) Applicants: Yu Zhu, Copley, OH (US); Bryan D. Vogt, State College, PA (US); Clinton J. Taubert, Akron, OH (US); Kun Chen, Akron, OH (US)

(72) Inventors: Yu Zhu, Copley, OH (US); Bryan D. Vogt, State College, PA (US); Clinton J. Taubert, Akron, OH (US); Kun Chen, Akron, OH (US)

(73) Assignee: The University of Akron, Akron, OH (US)

( * ) Notice: Subject to any disclaimer, the term of this patent is extended or adjusted under 35 U.S.C. 154(b) by 135 days.

(21) Appl. No.: 17/104,283

(22) Filed: Nov. 25, 2020

(65) Prior Publication Data

US 2021/0230398 A1    Jul. 29, 2021

Related U.S. Application Data

(60) Provisional application No. 62/966,194, filed on Jan. 27, 2020.

(51) Int. Cl.
| | | |
|---|---|---|
| *C08K 13/04* | (2006.01) | |
| *B82Y 30/00* | (2011.01) | |
| *B82Y 40/00* | (2011.01) | |
| *C08J 3/20* | (2006.01) | |
| *C08J 3/205* | (2006.01) | |
| *C08K 3/04* | (2006.01) | |
| *C08K 3/08* | (2006.01) | |
| *C08K 7/00* | (2006.01) | |
| *H01B 1/22* | (2006.01) | |
| *H01B 1/24* | (2006.01) | |

(52) U.S. Cl.
CPC .............. *C08K 13/04* (2013.01); *B82Y 30/00* (2013.01); *B82Y 40/00* (2013.01); *C08J 3/203* (2013.01); *C08J 3/205* (2013.01); *C08K 3/041* (2017.05); *C08K 3/08* (2013.01); *C08K 7/00* (2013.01); *H01B 1/22* (2013.01); *H01B 1/24* (2013.01); *C08K 2003/0806* (2013.01); *C08K 2201/001* (2013.01); *C08K 2201/004* (2013.01); *C08K 2201/005* (2013.01); *C08K 2201/011* (2013.01); *C08K 2201/014* (2013.01); *C08K 2201/016* (2013.01)

(58) Field of Classification Search
CPC .......... C08K 3/041; C08K 3/08; C08K 13/04; C08K 7/00; C08K 2201/004; C08K 2201/005; C08K 2201/016; C08K 2003/0806; C08K 9/04; H01B 1/22; H01B 1/24; B82Y 30/00; B82Y 40/00
USPC ................................. 252/502, 503, 510, 511
See application file for complete search history.

(56) References Cited

U.S. PATENT DOCUMENTS

| | | | | |
|---|---|---|---|---|
| 2010/0276645 | A1* | 11/2010 | Aspin | C09J 11/04 |
| | | | | 252/514 |
| 2012/0153239 | A1* | 6/2012 | Chandrasekhar | C01B 19/007 |
| | | | | 252/514 |
| 2012/0312102 | A1* | 12/2012 | Alvarez | F16J 15/064 |
| | | | | 252/514 |
| 2016/0185603 | A1* | 6/2016 | Bozalina | C30B 33/00 |
| | | | | 252/502 |
| 2017/0355894 | A1* | 12/2017 | Zhu | C09K 5/14 |

FOREIGN PATENT DOCUMENTS

| | | | | |
|---|---|---|---|---|
| KR | 1020150117531 A | * | 10/2015 | .............. C08L 63/00 |
| WO | WO-2010110626 A2 | * | 9/2010 | ............... H01B 1/02 |

OTHER PUBLICATIONS

Loos "High-Conductivity Polymer Nanocomposites Obtained by Tailoring the Characteristics of Carbon Nanotube Fillers." Adv. Funct. Mater. 2008, 18, 3226-3234 (Year: 2008).*

* cited by examiner

*Primary Examiner* — Tri V Nguyen

(74) *Attorney, Agent, or Firm* — Renner, Kenner, Greive, Bobak, Taylor & Weber Co., LPA

(57) ABSTRACT

In one or more embodiments, the present invention is directed to an electrically conductive polymer composition comprising a conductive metal filler material comprising a plurality of metal particles and one or more carbon-based filler material substantially homogenously dispersed throughout a polymer matrix, wherein the aspect ratio of the one or more carbon-based filler material is at least ten times greater than the aspect ratio of the conductive metal filler material comprising a plurality of metal particles. In one or more embodiment, the carbon-based filler material will comprise at least one of carbon nanotubes, multi-walled carbon nanotubes and edge-functionalized graphene.

21 Claims, 8 Drawing Sheets

ELECTRICALLY CONDUCTIVE POLYMER ADHESIVES WITH COMPLEX DIMENSIONAL FILTERS

CROSS REFERENCE TO RELATED APPLICATIONS

This application claims the benefit of U.S. provisional patent application Ser. No. 62/966,194 entitled "Electrical Conductive Adhesives with Multiple Filler System," filed Jan. 27, 2020, and incorporated herein by reference in its entirety.

STATEMENT REGARDING FEDERALLY SPONSORED RESEARCH OR DEVELOPMENT SUPPORT

This invention was made with government support under DE-AC02-765F00515 awarded by the U.S. Department of Energy. The government has certain rights in the invention.

FIELD OF THE INVENTION

One or more embodiments of the present invention relates to electrically conductive polymer compositions. In certain embodiments, the present invention relates to electrically conductive adhesive polymer compositions having complex dimensional fillers.

BACKGROUND OF THE INVENTION

Electrically conductive polymer composites, such as electrically conductive adhesives (ECAs), have long been an interesting component in electronics packaging technology for their ability to replace solder for die attachment, electrical interconnection, and heat dissipation and have recently evolved into an important technological area with the continual development of solar cell packaging technology, along with other areas. With the development of novel shingle cell stacking, conductive composites have become a standard material for building connections between cells.

Standard electrically conductive polymer composite systems have long used conductive fillers like silver, isotopically suspended in an insulative polymeric matrix which produces an adhesive and conductive final product. Electrically conductive polymer composites are generally made up of conductive fillers homogenously dispersed within a polymeric matrix host to render the final composite conductive. Historically, these conductive fillers rely on silver or specially synthesized materials which require a high-volume fraction loading; imparting extra expense on an already expensive filler system. Silver remains an expensive commodity and the silver loading in these materials is high, with typical volume fraction loadings reaching greater than 30% (weight percentage of silver over 85% in composite). The high silver loading is a result of the high theoretical critical volume percentage needed to complete a percolated network as governed by percolation theory.

Percolation theory has been used to determine the necessary volume fraction of material required to create the contacts which accommodate electron transfer via physical connection or tunneling. The limit in which percolation length approaches infinite is referred to as the percolation threshold ($P_c$). For monodisperse spherical fillers in a randomly oriented isotropic system, the required volume fraction loading to reach the percolation threshold is ~16%. See, Bueche, F. Electrical resistivity of Conducting Particles in an Insulating Matrix. *J. Appl. Phys.* 43, 4837-8 (1972), the disclosure of which is incorporated herein by reference in its entirety. However, filler aggregation often exacerbates this issue, resulting in filler loadings above 30% when seeking the desired, near metallic, electrical conductivity ($1\times10^3$-$1\times10^4$ S/cm) that is required for many practical applications. Besides silver spheres, the concentration of metal particles required to achieve $P_c$ (percolation threshold) has been reported over a wide range, from less than 1% to more than 40 vol %. This range of values occurs due to several factors, including processing techniques, particle size distribution, and particle aspect ratio. High aspect ratio and wide range distribution of particle sizes are known to decrease the $P_c$ value. See, e.g., Lyons, Alan M., and D. W. Dahringer. "Electrically conductive adhesives." Handbook of Adhesive Technology, (2003), the disclosure of which is incorporated herein by reference in its entirety.

Carbon nanomaterials have long been a growing topic in the electronics packaging field due to their attractive electrical conductivities, thermal conductivities, and low density. Recently, attempts have been made to use of carbon nanotubes (CNT) in the field of ECA materials for their unique mechanical, thermal, and electrical properties, but these attempts have failed to produce ECA materials having sufficient conductivity. Graphene has also received a considerable share of attention for having similar properties to that of carbon nanotubes. Graphene has 2D electron gas type electronic structure, possessing superior in-plane conductivity and low-sheet count graphene can have extremely exaggerated aspect ratios. However, graphene (not unlike CNTs) experiences issues with proper dispersion and reaggregation, which limits formation of macro electron pathways in ECA materials.

Accordingly, what is needed in the art is an electrically conductive polymer composition for use in ECAs and other applications having enhanced conductivity at reduced loadings that also addresses the dispersion and reaggregation problems known in the art.

SUMMARY OF THE INVENTION

In one or more embodiments, the present invention provides an electrically conductive polymer composition for use in ECAs and other applications having enhanced conductivity at reduced loadings while also addressing the dispersion and reaggregation problems known in the art. In various embodiments, low dimensional fillers, such as carbon nanotubes and edge-functionalized graphene, are employed along with silver flakes to produce an electrically conductive composite material with enhanced conductivity at unexpectedly reduced loadings. In some embodiments, electrical conductivities of 83.3 S/cm were found to be reachable at a loading of 12 vol % silver with only 7 wt % CNT filler. In the edge-functionalized graphene systems according to various embodiments of the present invention, it was found that conductivities as low as 89.3 S/cm could be reached at 15 vol % loading of silver with only 8 wt % of added edge-functionalized graphene. Both these novel systems were shown to be superior as compared to composites with only silver flakes, in which system similar conductivities were reached with 25 vol % silver loading.

In a first aspect, the present invention is directed to an electrically conductive polymer composition comprising: at least one conductive metal filler material comprising a plurality of metal particles having an aspect ratio and at least one carbon-based filler material having an aspect ratio at least ten times greater than the aspect ratio of the conductive metal filler material substantially homogenously distributed through a substantially non-conductive polymer matrix. In some embodiments, the difference between the aspect ratios of the conductive metal filler material and the carbon-based filler material is from about 10 to about $1 \times 10^8$. In one or more embodiments, the electrically conductive polymer composition of the present invention includes any one or more of the above referenced embodiments wherein the aspect ratio of the conductive metal filler material is from about 1 to about 10. In one or more embodiments, the electrically conductive polymer composition of the present invention includes any one or more of the above referenced embodiments wherein the aspect ratio of the carbon-based filler material is from about 1000 to about $1 \times 10^8$.

In one or more embodiments, the electrically conductive polymer composition of the present invention includes any one or more of the above referenced embodiments wherein the conductive metal filler material comprises a conductive metal selected from the group consisting of silver, silver flakes, copper, aluminum, silver coated metal, silver coated nickel, silver coated copper, silver coated aluminum, and combinations thereof. In one or more embodiments, the electrically conductive polymer composition of the present invention includes any one or more of the above referenced embodiments wherein the conductive metal filler material comprises silver flakes. In one or more embodiments, the electrically conductive polymer composition of the present invention includes any one or more of the above referenced embodiments wherein the particle size of the conductive metal filler material is from about 1 µm to about 1000 µm.

In one or more embodiments, the electrically conductive polymer composition of the present invention includes any one or more of the above referenced embodiments wherein the carbon-based filler material comprises a carbon-based material selected from the group consisting of carbon nanotubes, multi-walled carbon nanotubes, edge-functionalized graphene, edge-functionalized exfoliated natural graphite, metal coated carbon materials, and combinations thereof. In one or more embodiments, the electrically conductive polymer composition of the present invention includes any one or more of the above referenced embodiments wherein the carbon-based filler material comprises multi-walled carbon nanotubes. In one or more embodiments, the electrically conductive polymer composition of the present invention includes any one or more of the above referenced embodiments wherein the carbon-based filler material comprises edge-functionalized exfoliated natural graphite. In one or more embodiments, the electrically conductive polymer composition of the present invention includes any one or more of the above referenced embodiments wherein the carbon-based filler material is less than 50 nanometers long in at least one dimension.

In one or more embodiments, the electrically conductive polymer composition of the present invention includes any one or more of the above referenced embodiments wherein the polymer matrix is a substantially non-conductive polymer selected from the group consisting of polydimethylsiloxane, epoxies, polyacrylates, polymethacrylates, polyurethanes, and combinations thereof. In one or more embodiments, the electrically conductive polymer composition of the present invention includes any one or more of the above referenced embodiments wherein the polymer matrix comprises polydimethylsiloxane.

In one or more embodiments, the electrically conductive polymer composition of the present invention includes any one or more of the above referenced embodiments wherein the carbon-based filler material has a percolation threshold of from about 0.001% to about 2%. In some embodiments, the carbon-based filler material has a percolation threshold of less than 0.1%. In one or more embodiments, the electrically conductive polymer composition of the present invention includes any one or more of the above referenced embodiments having an electrical resistivity of 0.05 Ω·cm or less. In one or more embodiments, the electrically conductive polymer composition of the present invention includes any one or more of the above referenced embodiments wherein the conductive metal filler material comprises less than about 16% percent of the electrically conductive polymer by volume.

In one or more of these embodiments, the present invention is directed to an electrically conductive polymer composition comprising: from about 5 vol % to about 15 vol % of a conductive metal filler material comprising silver flakes having an aspect ratio of from about 1 to about 10 and a particle size of from about 1 µm to about 1000 µm; from about 0.001 wt % to about 8 wt % of a carbon-based filler material comprising: multi-walled carbon nanotubes having an aspect ratio of from about 1000 to about $10^8$ and a particle size of from about 1 to about 50 nm, edge-functionalized exfoliated natural graphite having a third aspect ratio of from about 1000 to about $10^8$ and a particle size in a shortest dimension of from about 0.3 nm to about 20 nm, or both; and from about 75 vol % to about 95 vol % of a polymer matrix comprising polydimethylsiloxane; wherein the conductive metal filler material comprising silver flakes and the at least one of multi-walled carbon nanotubes or edge-functionalized exfoliated natural graphite are substantially homogeneously distributed throughout the polymer matrix and the aspect ratio of the one or more carbon-based filler materials is at least 10 times larger than the aspect ratio of the conductive metal filler material.

In a second aspect the present invention is directed to a method of forming an electrically conductive polymer compositions described above using a method comprising: preparing or obtaining at least one conductive metal filler material comprising a plurality of metal particles having an aspect ratio; preparing or obtaining at least one carbon-based filler material having an aspect ratio that is at least ten times greater than the aspect ratio of the conductive metal filler material; preparing or obtaining at least one substantially non-conductive polymer having a polymer base and an intrinsic resistivity of $1 \times 10^{13}$ Ω·cm or more; combining the carbon-based filler material and the polymer base and mixing to distribute the carbon-based filler material throughout the polymer base; adding the conductive metal filler material to the mixture, wherein the conductive metal filler material comprises less than 15% of the total volume of the mixture; adding a quantity of solvent to the mixture and mixing to distribute the carbon-based filler material throughout the polymer base; removing the solvent by evaporation and curing the polymer mixture to produce the electrically conductive polymer described herein. In some embodiments, the difference between the aspect ratios of the conductive metal filler material and the carbon-based filler material is from about 10 to about $1 \times 10^8$.

In one or more embodiments, the method of the present invention includes any one or more of the above referenced embodiments wherein the step of adding the conductive metal filler material further comprises adding a curing agent for the polymer base to the mixture. In one or more embodiments, the method of the present invention includes any one or more of the above referenced embodiments wherein the conductive metal filler material comprises particles of a metal selected from the group consisting of silver, silver flakes, copper, aluminum, silver coated metal, silver coated nickel, silver coated copper, silver coated aluminum, and combinations thereof.

In one or more embodiments, the method of the present invention includes any one or more of the above referenced embodiments wherein the carbon-based filler material comprises a carbon-based material selected from the group consisting of carbon nanotubes, multi-walled carbon nanotubes, edge-functionalized graphene, edge-functionalized exfoliated natural graphite, metal coated carbon materials, and combinations thereof. In one or more embodiments, the method of the present invention includes any one or more of the above referenced embodiments wherein the carbon-based filler material comprises at least one of edge-functionalized exfoliated natural graphite and a plurality of multi-walled carbon nanotubes.

In one or more embodiments, the method of the present invention includes any one or more of the above referenced embodiments wherein the substantially non-conductive polymer is polydimethylsiloxane, epoxies, polyacrylates, polymethacrylates, polyurethanes, or combinations thereof. In one or more embodiments, the polymer matrix is adhesive. In one or more embodiments, the method of the present invention includes any one or more of the above referenced embodiments wherein the step of mixing is performed by a planetary centrifugal mixer.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1:
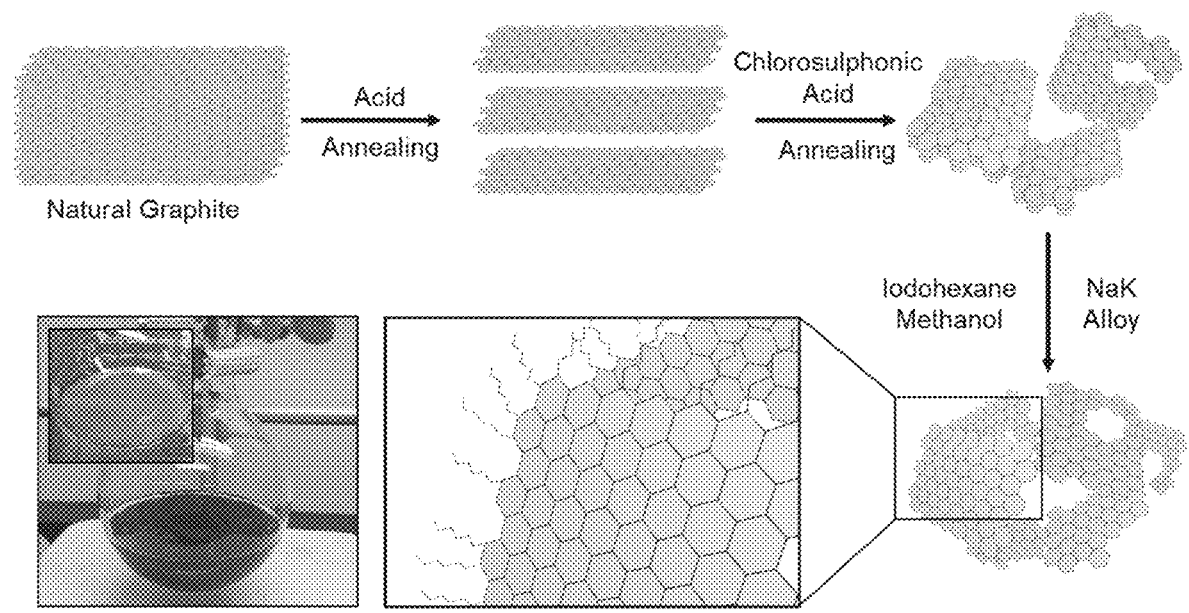
FIG. 1 is a schematic diagram showing a synthetic scheme of Edge-Functionalized Graphene (EFG) and reaction showing inset color change of the solvated electron solution and final product.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

In various embodiments, the present invention is directed to electrically conductive polymer compositions for use as an electrically conductive adhesive (ECA) and in numerous other applications, and methods for their making. As set forth above, these novel materials have been found to be effective in greatly reducing the amount of expensive conductive metal filler materials (like silver flakes) necessary to make the composition conductive. In these compositions, some of the highly conductive and expensive filler materials conventionally used in forming electrically conductive polymer compositions, such as silver flakes, are replaced with one or more carbon-based filler material formed of particles of a carbon-based material having a much higher aspect ratio. While not wishing to be bound by theory, it is believed that altering the dimensions and/or aspect ratio distributions of the fillers in a two filler system so that the two fillers have very different aspect ratios, decreases the percolation threshold.

In various embodiments, the electrically conductive composite material of the present invention comprises conducive metal filler particles having a relatively low aspect ratio and one or more carbon-based filler material having a relatively high aspect ratio, distributed throughout a generally non-conductive polymer matrix. The highly conductive metal particles typically used in known electrically conductive composite systems have relatively low aspect ratios, generally from about 1 to about 10. In the present invention, however, some of the conducive metal filler particles are replaced with one or more carbon-based filler materials that have aspect ratios that are at least 10 times greater. As a result, the electrically conductive composite materials of the present invention demonstrate an enhanced conductivity at reduced loadings. In some embodiments, electrical conductivities of 83.3 S/cm were found to be reachable at loadings as low as 12 vol % silver with only 7 wt % of a CNT filler. In the edge-functionalized graphene systems according to various embodiments of the present invention, it was found that conductivities as low as 89.3 S/cm could be reached at 15 vol % loading of silver with only 8 wt % of added edge-functionalized graphene. Both these novel systems were shown to be superior as compared to composites with only silver flakes, in which systems similar conductivities were reached with 25 vol % silver loading.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term "about."

It should be also understood that the ranges provided herein are a shorthand for all of the values within the range and, further, that the individual range values presented herein can be combined to form additional non-disclosed ranges. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As used herein, the following abbreviations, acronyms, and initialisms are defined as follows: CNT (carbon nanotubes); DME (1,2-dimethoxyethane); ECA (electrically conductive adhesive); EFENG (Edge-Functionalized Exfoliated Natural Graphite); EFG (exfoliated natural graphene); EFG XRD (exfoliated natural graphene X-ray diffraction spectrum); $KC_8$ (Potassium graphite—a well-known graphite intercalation compound prepared by melting potassium over graphite powder); MWCNT (multi-wall carbon nanotubes); NaK (sodium-potassium liquid alloy); $P_c$ (percolation threshold); PDMS (polydimethylsiloxane); PTFE filter (polytetrafluoroethylene filter); SAED (selected area electron diffraction); SEM (Scanning Electron Microscopy); TEM (Transmission Electron Microscopy); UCE (Ultrasonic Bath Cleaner); XPS (X-ray photoelectron spectroscopy); and XRD (X-ray diffraction), unless clearly defined or used otherwise herein.

Further, as applied to three dimensional object such as the conductive filler material and edge-functionalized graphene filler material of the present invention having a length (x), width (y) and height or thickness (z), the term "aspect ratio" or "particle aspect ratio" refers to the ratio of the largest of dimensions x, y, and z, divided by the smallest of dimensions x, y, and z. As applied to carbon nanotubes having a length and a diameter, the term "aspect ratio" is used to refers to the ratio of the length to the diameter of the carbon nanotube.

As used herein the terms "alkyl halide" and "haloalkane" are used interchangeably to refer to a class of chemical compounds in which one or more hydrogen atoms in an alkane have been replaced by halogen atoms (i.e., fluorine, chlorine, bromine, or iodine). Examples of suitable alkyl halides include, without limitation iodoalkanes, chloroalkanes, bromoalkanes, 1-iodohexane or combinations thereof.

As used herein, the term "critical volume percentage" refers to refers to the minimum volume percentage of filler necessary to construct a percolation network. As set forth above, the term percolation threshold" ($P_c$) refers to the limit in which percolation length approaches infinite.

All publications, patent applications, patents, and other references mentioned herein are expressly incorporated by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning. Further, any compositions or methods provided herein can be combined with one or more of any of the other compositions and methods provided herein. The fact that given features, elements or components are cited in different dependent claims does not exclude that at least some of these features, elements or components may be used in combination together.

In a first aspect, the present invention is directed to an electrically conductive polymer composition comprising one or more highly conductive filler material formed of metal particles having a relatively low aspect ratio and one or more carbon-based filler material formed of particles of a carbon-based material having a relatively high aspect ratio, homogeneously distributed throughout a generally non-conductive polymer matrix. As set forth above, the present invention is generally directed to an electrically conductive polymer comprising: a plurality of metal particles having a first aspect ratio, one or more carbon-based filler material having a second aspect ratio, and a polymer filler, wherein said second aspect ratio is at least ten times greater than said first aspect ratio.

In various embodiments, the conductive metal filler material will comprise a plurality of small conductive metal particles having a relatively low aspect ratio. The type of conductive metal used is not particularly limited and would include any conductive metal particles conventionally used in forming conductive polymer materials, like ECAs. Suitable materials may include, without limitation, silver, silver flakes, copper, aluminum, silver coated metal, silver coated nickel, silver coated copper, silver coated aluminum, and any combinations and alloys thereof. In some embodiments, more than one conductive metal filler material may be used.

As set forth above, the conductive metal particles will have an aspect ratio of from about 1 to about 10. In some embodiments, the conductive metal particles will have an aspect ratio of from about 2 to about 10, in other embodiments, from about 4 to about 10, in other embodiments, from about 6 to about 10, in other embodiments, from about 8 to about 10, in other embodiments, from about 1 to about 9, in other embodiments, from about 1 to about 7, in other embodiments, from about 1 to about 5, and in other embodiments, from about 1 to about 3.

The shape of the metal particles is not particularly limited, provided that the aspect ratio is within the ranges set forth above. In some embodiments, the conductive metal filler particles comprise silver flakes. In some embodiments, the conductive metal particles comprise silver spheres.

In one or more embodiments, the conductive metal filler particles will have a mean particle size of from about 1 µm to about 1000 µm, as measured at the particle's widest point. In some embodiments, the conductive metal filler particles will have a mean particle size of from about 1 µm to about 800 µm, in other embodiments from about 1 µm to about 600 µm, in other embodiments from about 1 µm to about 400 µm, in other embodiments from about 1 µm to about 200 µm, in other embodiments from about 1 µm to about 100 µm, in other embodiments from about 100 µm to about 1000 µm, in other embodiments from about 300 µm to about 1000 µm, in other embodiments from about 500 µm to about 1000 µm, in other embodiments from about 700 µm to about 1000 µm, and in other embodiments from about 900 µm to about 1000 µm, as measured at the particle's widest point.

In some embodiments, the conductive metal particles will be substantially spherical and have a mean particle diameter of from about 1 µm to about 1000 µm. In some of these embodiments, the conductive metal filler particles will have a mean diameter of from about 1 µm to about 800 µm, in other embodiments from about 1 µm to about 600 µm, in other embodiments from about 1 µm to about 400 µm, in other embodiments from about 1 µm to about 200 µm, in other embodiments from about 1 µm to about 100 µm, in other embodiments from about 100 µm to about 1000 µm, in other embodiments from about 300 µm to about 1000 µm, in other embodiments from about 500 µm to about 1000 µm, in other embodiments from about 700 µm to about 1000 µm, and in other embodiments from about 900 µm to about 1000 µm.

In various embodiments, the conductive metal filler comprises from about 5 vol % to about 20 vol %, and is preferably less than about 16 vol %, of the electrically conductive polymer composition. In some embodiments, the conductive metal filler particles comprises from about 8 vol % to about 16 vol % of the electrically conductive polymer composition. In some embodiments, the conductive metal filler particles comprises from about 5 vol % to about 18 vol %, in other embodiments, from about 5 vol % to about 16 vol %, in other embodiments, from about 5 vol % to about 14 vol %, in other embodiments, from about 5 vol % to about 12 vol %, in other embodiments, from about 5 vol % to about 10 vol %, in other embodiments, from about 5 vol % to about 8 vol %, in other embodiments, from about 7 vol % to about 20 vol %, in other embodiments, from about 9 vol % to about 20 vol %, in other embodiments, from about 11 vol % to about 20 vol %, in other embodiments, from about 13 vol % to about 20 vol %, in other embodiments, from about 15 vol % to about 20 vol %, and in other embodiments, from about 17 vol % to about 20 vol %, of the electrically conductive polymer composition. In some embodiments, the carbon nanotubes or multiwalled carbon nanotubes comprise from about 5 vol % to about 13 vol % of the electrically conductive polymer composition.

As set forth above, the electrically conductive polymer composition of the present invention further comprises one or more types of carbon-based filler material having a much higher aspect ratio. In various embodiments, these carbon-based fillers my comprise, without limitation, carbon nanotubes, multi-walled carbon nanotubes, edge-functionalized graphene, edge-functionalized exfoliated natural graphite, metal coated carbon materials, and combinations thereof. In some embodiments, the carbon-based filler material comprises carbon nanotubes. In other embodiments, the carbon-based filler material comprises multi-walled carbon nanotubes. In some embodiments, the carbon-based filler material comprises edge-functionalized exfoliated natural graphite.

As will be understood by those of skill in the art, graphene sheets do not disperse well in most polymers and are prone to reaggregation. Because of this, functionalization of graphene sheets via alkyl chains is generally required for these types of applications. In one or more embodiments, the graphene sheets are functionalized by grafting alkyl chains on the edge of graphene to form edge functionalized graphene. This has been found to increase the dispersibility and solubility without scarifying the conductivity of the graphene sheets Other forms of edge functionalize graphene are commercially available and may be used but are not preferred.

In various embodiments, these carbon-based filler materials will have an aspect ratio of from about 1000 to about $1 \times 10^8$. In some embodiments, the carbon-based filler materials will have an aspect ratio of from about $1 \times 10^4$ to about $1 \times 10^8$, in other embodiments, from about $1 \times 10^5$ to about $1 \times 10^8$, in other embodiments, from about $1 \times 10^6$ to about $1 \times 10^8$, in other embodiments, from about $1 \times 10^7$ to about $1 \times 10^8$, in other embodiments, from about 10 to about $1 \times 10^7$, in other embodiments, from about 10 to about $1 \times 10^6$, in other embodiments, from about 10 to about $1 \times 10^5$, in other embodiments, from about 10 to about 10,000, and in other embodiments, from about 10 to about 1000.

In various embodiments, the carbon-based filler material will have a mean particle size of from about 10 µm to about 10 mm, as measured at the particle's widest point. In some embodiments, the carbon-based filler material will have a mean particle size of from about 10 µm to about 1 mm, in other embodiments, from about 200 µm to about 1 mm, in other embodiments, from about 400 µm to about 1 mm, in other embodiments, from about 600 µm to about 1 mm, in other embodiments, from about 800 µm to about 1 mm, in other embodiments, from about 10 µm to about 5 mm, in other embodiments, from about 10 µm to about 900 µm, in other embodiments, from about 10 µm to about 700 µm, in other embodiments, from about 10 µm to about 500 µm, in other embodiments, from about 10 µm to about 300 µm, in other embodiments, from about 10 µm to about 100 µm, as measured at the particle's widest point. In one or more embodiments, the carbon-based filler material is less than 50 nanometers long in at least one dimension.

As set forth above, carbon-based filler materials used will have a much higher aspect ratio than conductive metal particles described above. In one or more embodiments, the aspect ratio of the carbon-based filler materials will be at least 10 times the aspect ratio of the conductive metal particles described above. In some embodiments, the difference between said aspect ratio of the conductive metal particles and the aspect ratio of the carbon-based filler material is from about 10 to about $1 \times 10^8$. In some embodiments, the difference between said aspect ratio of the conductive metal particles and the aspect ratio of the carbon-based filler material is from about 10 to about $1 \times 10^8$, in other embodiments, from about 100 to about $1 \times 10^8$, in other embodiments, from about 1000 to about $1 \times 10^8$, in other embodiments, from about 10,000 to about $1 \times 10^8$, in other embodiments, from about $1 \times 10^5$ to about $1 \times 10^8$, in other embodiments, from about $1 \times 10^6$ to about $1 \times 10^8$, in other embodiments, from about 10 to about $1 \times 10^7$, in other embodiments, from about 10 to about $1 \times 10^6$, in other embodiments, from about 10 to about $1 \times 10^5$, in other embodiments, from about 10 to about $1 \times 10^4$, in other embodiments, from about 10 to about 1000, and in other embodiments, from about 10 to about 500.

Further, in one or more embodiments, the carbon-based filler material will percolation threshold ($P_c$) of from about 0.001% to about 2% and is preferably less than 0.1%. In some embodiments, the carbon-based filler material will percolation threshold ($P_c$) of from about 0.001% to about 2%, in other embodiments, from about 0.001% to about 1.5%, in other embodiments, from about 0.001% to about 1%, in other embodiments, from about 0.001% to about 0.1%, in other embodiments, from about 0.001% to about 0.01%, in other embodiments, from about 0.001% to about 0.005%, in other embodiments, from about 0.005 to about 2%, in other embodiments, from about 0.01 to about 2%, in other embodiments, from about 0.05 to about 2%, in other embodiments, from about 0.1 to about 2%, and in other embodiments, from about 1% to about 2%. As will be apparent to those of skill in the art, the $P_c$ will lower for the carbon-based filler material that for the metal particle filler. Because of this, the $P_c$ of the electrically conductive polymer composition as a whole will be the same as the $P_c$ for the carbon-based filler material, or the carbon-based filler material with the lowest $P_c$, if there is more than one.

In some embodiments, the electrically conductive polymer composition of the present invention may contain more than one carbon-based filler material. In some of these embodiments, electrically conductive polymer composition will contain both carbon nanotubes and edge functionalized graphene fillers.

In various embodiments, the one or more carbon-based filler materials will comprise from about 0.001 wt % to about 10 wt % of the electrically conductive polymer composition of the present invention. In some embodiments, the one or more carbon-based filler materials will comprise from about 0.001 wt % to about 8 wt %, in other embodiments from about 0.001 wt % to about 7 wt %, in other embodiments from about 0.001 wt % to about 6 wt %, in other embodiments from about 0.001 wt % to about 4 wt %, in other embodiments from about 0.001 wt % to about 2 wt %, in other embodiments from about 0.001 wt % to about 1 wt %, in other embodiments from about 0.1 wt % to about 10 wt %, in other embodiments from about 1 wt % to about 10 wt %, in other embodiments from about 2 wt % to about 10 wt %, in other embodiments from about 4 wt % to about 10 wt %, and in other embodiments from about 6 wt % to about 10 wt % of the electrically conductive polymer composition of the present invention. In some embodiments the one or more carbon-based filler materials will comprise from about 0.1 wt % to about 8 wt % of the electrically conductive polymer composition of the present invention.

Further, as will be apparent to those of skill in the art the carbon-based filler materials used with the electrically conductive polymer composition of the present invention will be electrically conductive, if not as conductive as the conductive metal particle fillers described above. Pure carbon has an inherent resistivity of from about $6\times10^{-2}$ Ω·cm to about $4\times10^{-4}$ Ω·cm and is generally about one order of magnitude less conductive than silver which has an intrinsic resistivity of about $1.6\times10^{-6}$ Ω·cm As set forth above, the electrically conductive polymer composition of the present invention further comprises a polymer matrix in which the fillers described above are substantially homogeneously distributed. As used herein, the term "substantially homogeneously distributed" is used to mean that the filler materials are generally evenly distributed throughout the polymer matrix such that the properties of the electrically conductive polymer composition do not vary significantly at different locations in the polymer matrix. There is no need for the polymer forming the polymer matrix to be conductive and it is preferred that the polymer used be substantially non-conductive. In one or more embodiments, the polymer material selected for the polymer matrix will be substantially non-conductive under normal operational conditions, preferably having an electrical resistivity of $10^{13}$ Ω·cm or less.

The substantially non-conductive polymer used is not particularly limited but is preferably adhesive, particularly if the electrically conductive polymer composition will be used as an electrically conductive adhesive (ECA). In one or more embodiments, suitable substantially non-conductive polymers may include polydimethylsiloxane, epoxies, polyacrylates, polymethacrylates, polyurethanes, or combinations thereof. In some embodiments, the polymer matrix will comprise polydimethylsiloxane (PDMS).

As set forth above, the electrically conductive polymer composition of the present invention allows for enhanced conductivity at reduced loadings of expensive metal particle fillers. While not wishing to be bound by theory, it is believed that the carbon-based fillers form 1-D (2-D) channels among the conductive metal particles, replacing some of them with the lower cost carbon material. In various embodiments, the electrically conductive polymer compositions of the present invention will have an electrical resistivity of less than about 0.05 Ω·cm. At the same time, these conductive metal material fillers comprise less than about 16% percent of the electrically conductive polymer composition by volume. In some embodiments, these conductive metal material fillers comprise less than about 15% percent of the electrically conductive polymer composition by volume. In some other embodiments, these conductive metal material fillers comprise less than about 14% percent of the electrically conductive polymer composition by volume. In some other embodiments, the conductive metal material fillers comprise less than about 13% percent of the electrically conductive polymer composition by volume. In other embodiments, the conductive metal material fillers comprise less than about 12% percent of the electrically conductive polymer composition by volume. These loadings constitute a surprisingly significant decrease in silver loading relative to comparable known systems.

In one or more embodiments, the electrically conductive polymer composition of the present invention will comprise: from about 5 vol % to about 15 vol % of a conductive metal filler material comprising silver flakes and having an aspect ratio of from about 1 to about 10 and a particle size of from about 1 μm to about 1000 μm; from about 0.001 wt % to about 8 wt % of a carbon-based filler material comprising at least one of (1) at least one of multi-walled carbon nanotubes having an aspect ratio of from about 1000 to about $10^8$ and a particle size of from about 1 to about 50 nm and (2) an edge-functionalized exfoliated natural graphite having an aspect ratio of from about 1000 to about $10^8$ and a particle size in a shortest dimension of from about 0.3 nm to about 20 nm, wherein the aspect ratio of the carbon-based filler material is at least 10 times larger than the aspect ratio of the silver flakes; and from about 75 vol % to about 95 vol % of a polymer material comprising polydimethylsiloxane.

In a second aspect, the present invention is directed to a method of making the electrically conductive polymer compositions described above that allows the various fillers to be substantially homogeneously distributed throughout the polymer matrix. To begin with, conductive metal particle filter and at least one carbon-based filler material as described above are prepared or otherwise obtained. In some embodiments the conductive metal particles may comprise silver flakes or silver spheres. In some embodiments, the carbon-based filler material will comprise carbon nanotubes. In some embodiments, the carbon-based filler material will comprise multi-walled carbon nanotubes. In some other embodiments, the carbon-based filler material will comprise edge functionalized graphene. In still other embodiments the carbon-based filler material will comprise both multi-walled carbon nanotubes and edge functionalized graphene. The filler materials will have the particle size and distribution described above.

Methods for forming these materials are well known in the art and need not be described in depth here. Carbon nanotubes and multi-walled carbon nanotubes are commercially available and can be synthesized using any one of numerous methods known in the art. One of ordinary skill in the art will be able to obtain or synthesize suitable carbon nanotubes or multiwalled carbon nanotubes without undue experimentation. Similarly, graphite powder may be exfoliated to form graphene using any conventional methods but is preferably made using liquid phase exfoliation methods. Suitable methods for edge functionalization of graphene are likewise known in the art and include, without limitation, the method shown in FIG. 1 and described below.

One method of forming edge-functionalized graphene is shown in FIG. 1. In these embodiments, an acid expansion method is used to pre-expand graphene galleries and induce more effective later exfoliation via intercalation. In the embodiment shown in FIG. 1, Pristine graphite material, preferably in powder form, was soaked in a mixture of sulfuric acid and nitric acid. When the pristine graphite is immersed into the acid, the acid groups are intercalated into the graphite flakes. After neutralizing and drying, the collected powder is then annealed in a tube furnace at a temperature of from 800° C. to about 900° C. in an inert atmosphere to expand the graphite. In some embodiments, the collected powder may be expanded in a tube furnace under 850° C. with argon flow. It is believed that the acid groups are intercalated into the graphite flakes allows the tube furnace to expand the graphite with evaporative ablation more efficiently. To induce particle size disparity and ensure complete expansion, the graphite is then treated with a strong acid, which decreases the particle size of graphite galleries, increasing the efficiency of following edge reactions. In the embodiment shown in FIG. 1, the strong acid used is chlorosulphonic acid.

In the edge-functionalized graphene is shown in FIG. 1, NaK and DME are then used to exfoliate the pre-expanded graphite. Since potassium (K) can be easily intercalated into graphene galleries with a 1,2-dimethoxyethane (DME) solution and an excess of sodium/potassium alloy (Na/K) can attain the intercalated compounds with a formula as close as possible to $KC_8$. In these embodiments, the edge atoms of the graphite are reduced to their carbanionic form and thus very reactive to electrophilic attack and can be functionalized. In these embodiments, these edge atoms are functionalized using a primary alkyl halide, such as an iodoalkane (here, 1-iodohexane). Other suitable alkyl halides may include, without limitation, iodoalkanes, chloroalkanes, bromoalkanes, 1-iodohexane, or combinations thereof. In one or more of these embodiments, the alkyl halides used will be a primary alkyl halide, although tis need not be the case. As the reaction occurs, the electrons of the alkalis are transferred to the solution and a visualized dark blue was observed in the reaction container. (See, FIG. 1). In the embodiments shown in FIG. 1, an iodoalkanes (1-iodohexane) is added to the reaction mixture. The iodic group has a high electron density so that stochastically it will react with the active sites on the edges of the expanded graphite flakes. Due to the intercalation of the NaK, sodium atoms remain between the graphite layers. Finally, the reactions, quenching the reaction with methanol to substitute hydrogen between the graphite flakes, promoting each graphite flake to separate from each other, thereby producing edge-functionalized graphene. It has been found that grafting alkyl chains onto the edge of graphene substantially increases the dispersibility and solubility of the graphene without sacrificing the conductivity of the graphene sheets.

As discussed above, in various embodiments the aspect ratio of the carbon-based filler materials will be at least 10 time greater than the aspect ratio of the conductive metal particles. In some of these embodiments, the difference between said aspect ratio of the conductive metal particles and the aspect ratio of the carbon-based filler material is as described above.

Next, a substantially non-conductive polymer having an intrinsic resistivity higher than $10^{13}$ Ω·cm is selected. As set forth above, suitable polymers may include polydimethylsiloxane, epoxy, polyacrylates, polymethacrylates, polyurethanes, or combinations thereof. In some embodiments, the polymer matrix will comprise polydimethylsiloxane (PDMS). These polymers will be cured using methods known in the art for curing that particular polymer and the curing may be initiated using methods appropriate for the polymer chosen. In some embodiments like PDMS, a two-part system comprising a polymer base (Part A) and a curing agent (Part B) to initiate and crosslink the polymer are used. However, polymers cured using other initiators such as heat or light may also be used.

Generally, the electrically conductive polymer compositions described above are made by distributing the conductive metal particle filler and one or more carbon-based fillers discussed above are added to the substantially non-conductive polymer, uniformly distributed throughout the polymer, and the polymer then cured by the appropriate method. In various embodiments, steps are taken to control the viscosity of the polymer mixture to aid in dispersal of the fillers throughout the polymer and to more quickly cure the polymer to help prevent reaggregation of the filler material.

In one embodiment, for example, PDMS was used to form the polymer matrix but with a modified ratio of polymer base to curing agent. The ratio the standard polymer base to curing agent ratio for PDMS is 10:1 but, in these embodiments, the ratio was reduced to 8:1 to facilitate the integration of the conductive metal particles and carbon-based fillers into the polymer matrix and reduce cross linking (curing) time. Further, a small amount of one or more solvents may be added to the polymer/filler mixture to reduce the viscosity of the polymer and promote integration and dispersal of the conductive metal particles and carbon-based fillers into and throughout the polymer matrix. Any suitable solvent for the polymer being used provided that it does not either degrade the polymer and/or fillers being used or interfere with the curing process for the polymer. Suitable solvents may include, without limitation, chloroform, dimethylformamide (DMF), N-methyl-2-pyrrolidone (NMP), ethanol, dichloromethane and combinations thereof. One of ordinary skill in the art will be able to select a suitable polymer without undue experimentation. The solvents are later removed by conventional means, preferably by evaporation.

In some of these embodiments, the carbon-based filler materials are premixed into the polymer base before the metal particle filler and curing agent are added. As will be apparent to those of skill in the art, the carbon-based filler materials are premixed into the polymer base to form a masterbatch, since this can be accomplished without greatly changing the rheologic properties of the polymer. As will also be apparent, since the multiple filler particles would dramatically increase the viscosity in the mixture and limit the mixing efficiency, a small quantity of a solvent for the polymer may be added to facilitate mixing and distribution. In some embodiments, a small quantity of hexane, or another suitable solvent for the polymer, is added to help the dispersion of the filler materials throughout the polymer matrix and then later removed. As it must be removed, only enough solvent to facilitate dispersion of the filler materials throughout the polymer matrix should be added. In some of these embodiments, the added hexane is removed by evaporation under reduced pressure. One of ordinary skill in the art will be able to select add and remove a suitable solvent without undue experimentation.

As will be apparent, the polymer/filler mixture must be vigorously mixed to facilitate substantially homogeneous dispersion of the filler materials throughout the polymer matrix. The polymer/filler mixture may be mixed using any conventional method but is preferably mixed using a planetary mixer. Planetary mixers use both self-rotation and revolution to maximize mixing efficiency.

The polymer matrix may be cured by any appropriate method for the polymer used that does not either degrade the polymer matrix or the filler materials. The curing process may be initiated at any point during the mixing process provided that neither the initiation step nor the curing process interferes with the dispersion of the filler materials throughout the polymer matrix. In some embodiments, the polymer is cured by means of a curing agent or crosslinking agent with or without the addition of an initiator such as heat or light. In some other embodiments, curing is initiated by a combination of heat and/or light and a curing agent, crosslinking agent, catalyst, or other chemical compound.

EXPERIMENTAL

In order to evaluate and further reduce to practice the electrically conductive polymer compositions of the present invention, electrically conductive polymer compositions comprising 12v % silver flakes with either 7 wt % of MWCNT or 8 wt % of EFENG dispersed in a matrix of PDMS were fabricated and tested.

Synthesis of EFG

As set forth above, it is known that grafting alkyl chains onto the edge of graphene sheets increases their the dispersibility and solubility without scarifying their conductivity. Further, it is known that liquid phase production methods may be used to scalably produce high graphene quality. Accordingly, NaK was used to exfoliate natural graphite powder and functionalized it with 1-iodohexane to produce edge-functional exfoliated natural graphene (EFG).

FIG. 1 displays the scheme of EFG preparation. In effort to pre-expand graphene galleries and induce more effective later exfoliation via intercalation, an acid expansion method was adopted. Pristine graphite material was soaked in the mixture of sulfuric acid and nitric acid. After neutralizing and drying, the collected powder was expanded in a tube furnace under 850° C. with argon flow. When the pristine graphite immersed into the mixture acid, the acid groups intercalated into the graphite flakes. The following thermal treatment in tube furnace then expanded the graphite with evaporative ablation more efficiently. To induce particle size disparity and ensure complete expansion, a subsequent chlorosulphonic acid treatment was performed. The strong acid treatment decreases the particle size of graphite galleries, increasing the efficiency of following edge reactions. Since potassium (K) can be easily intercalated into graphene galleries with 1,2-dimethoxyethane (DME) solution and an excess of sodium/potassium alloy (Na/K) can attain the intercalated compounds with a formula as close as possible to $KC_8$, NaK and DME were used to exfoliate the pre-expanded graphite. Under such the conditions, the edge atoms should be in the reduced carbanionic form and thus very reactive with electrophilic attack. As the reaction occurs, the electron of alkalis would transfer to the solution and a visualized dark blue was observed in the reaction container. Iodoalkanes (1-iodohexane) are added to the reaction mixtures, the iodic group contains high electron density so that stochastically it will react with the active sites on the edges of the expanded graphene flakes. Due to the intercalation of the NaK, sodium atoms remain between the graphite layers. Quenching the reaction with methanol can introduces hydrogen between the graphite flakes, promoting separation.

Figure 2A:
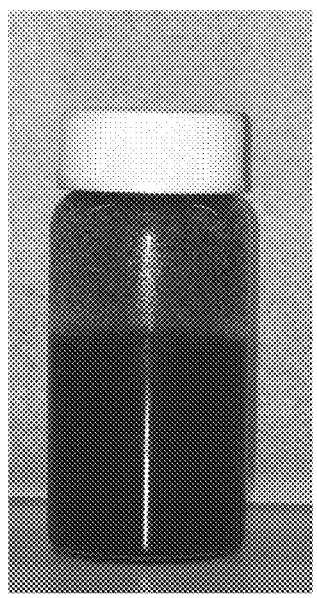
FIGS. 2A-F are images showing EFG and natural graphite, including a photograph of EFG dispersed in chloroform after one week (FIG. 2A), SEM image of natural graphite (FIG. 2B), SEM image of expanded graphite (FIG. 2C), SEM image of graphite after chlorosulphonic acid treatment (FIG. 2D), SEM image of EFG (FIG. 2E), TEM image of EFG, the onset is the selected area diffraction pattern (FIG. 2F)
Figure 2B:
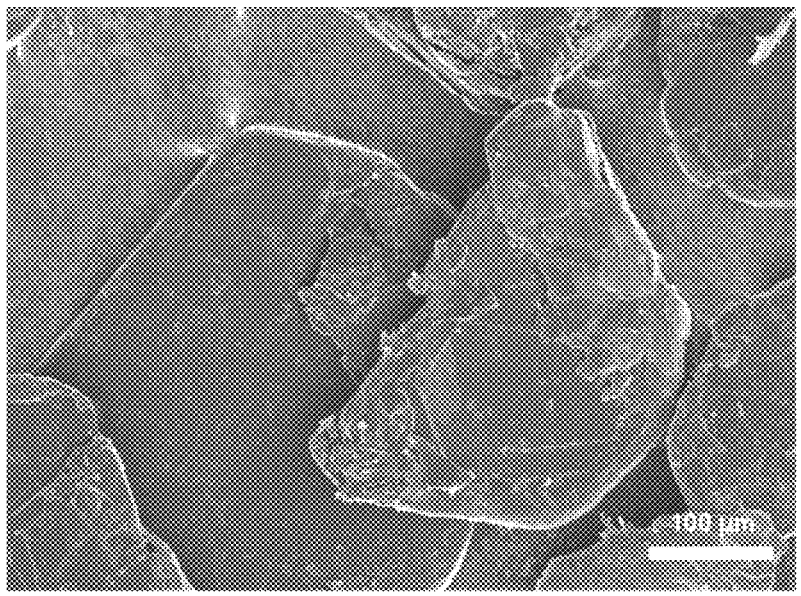
Figure 2C:
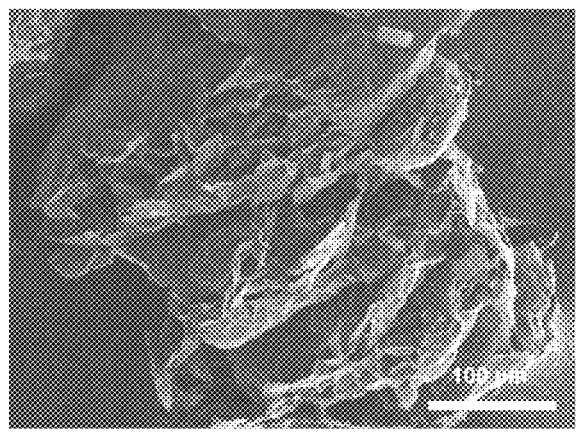
Figure 2D:
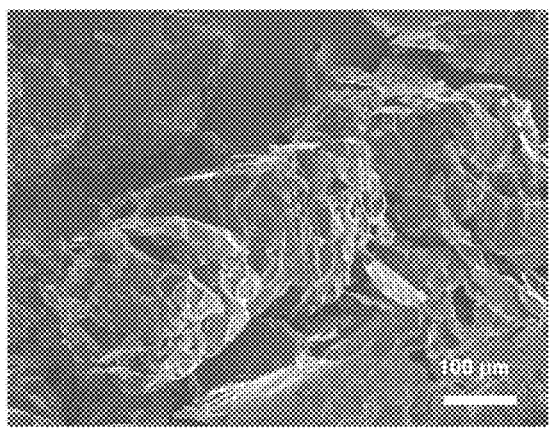
Figure 2E:
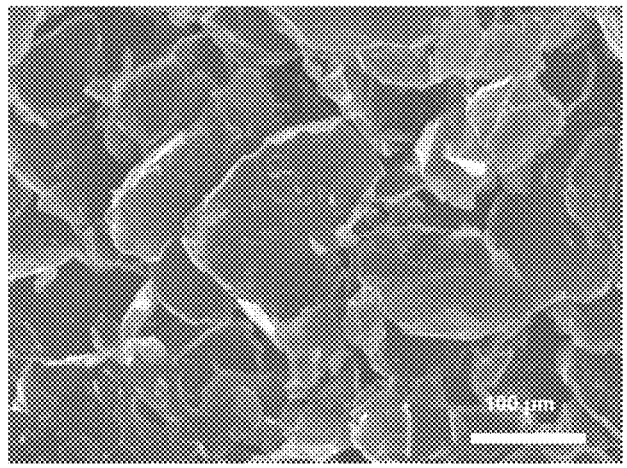
Figure 2F:
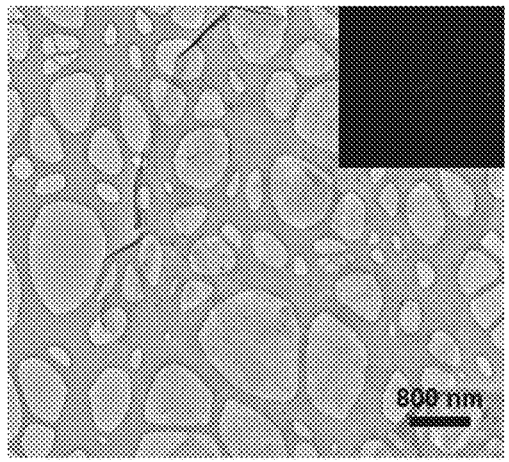
Figure 3A:
FIGS. 3A-C are optical images of: natural graphite (FIG. 3A); the worm-like structure of acid treated, expanded graphite (FIG. 3B); and exfoliated graphene collected in the funnel (FIG. 3C)
Figure 3B:
Figure 3C:

With the described two-step expansion procedures, relatively large scale (gram scale) of EFG can be achieved. The total exfoliation yield was calculated using the mass ratio of dried EFG powder and pristine natural graphite flakes, which is around 70%. As set forth above, the dispersibility of the pristine graphite is knowns as poor, however, the functionalized edges greatly increased the dispersibility of the graphene sheets. As shown in FIG. 2A, the EFG dispersion in chloroform with concentration of 20 mg/mL is stable for over one week without any apparent precipitation. Scanning electron microscopy (SEM) was used to evaluate the results from the different exfoliation procedures. FIG. 2B displays the close-packed array structure of natural graphite structure under the SEM. As can be seen in FIG. 2C and FIG. 3B, the acid group intercalated graphite layers expanded into worm-like structure composed of thick layers. To further open the graphite boundaries for next exfoliation, chlorosulphonic acid treatment was used to re-expand the graphite sheets, which turn to expanded particles composed of relatively smaller and thinner sheets (FIG. 2D). The exfoliation step relies on intercalation of potassium and sodium, which support the active group on the edges of graphite sheets for the functionalization of iodo-alkyl chains. Tip-sonication was employed for refining the product and most of the graphite layers separated from each other with curly and folded structure, which indicates the thin and soft structure of graphite sheets. (FIG. 2E) Transmission electron microscopy (TEM) result (FIG. 2F) also reveals a thin film structure of graphene sheet, which indicates the high-aspect ratio properties of the material. 6-fold symmetry in the selected area electron diffraction (SAED, inset of FIG. 2F) pattern is an indication of the preserved hexagonal crystalline carbon structure after exfoliation.

Figure 4A:
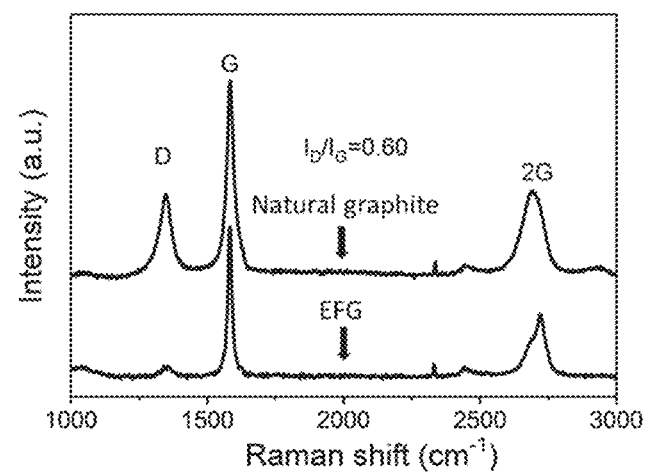
FIGS. 4A-B are graphs showing Raman spectra of EFG and natural graphite (FIG. 4A), and the results of high resolution XPS C1s spectrum of EFG (FIG. 4B)
Figure 4B:
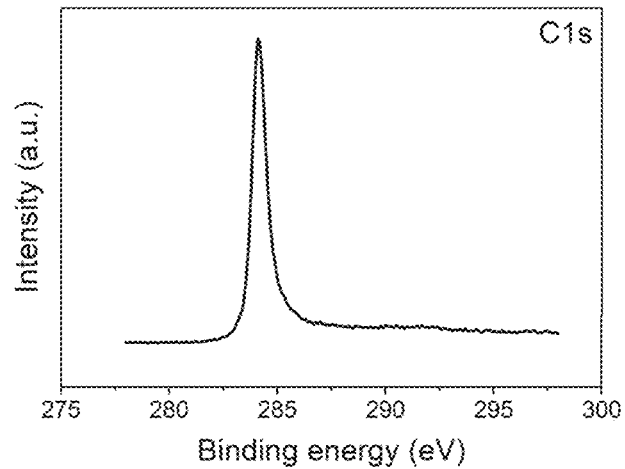
Figure 5:
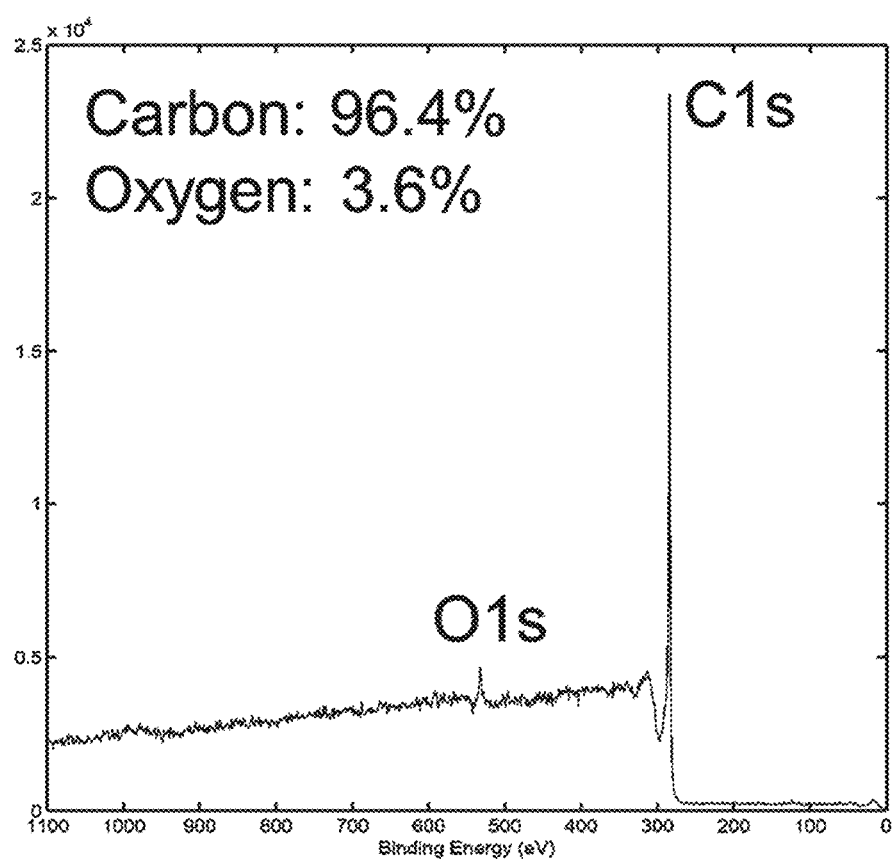
FIG. 5 is a an XPS survey of EFG.
Figure 6:
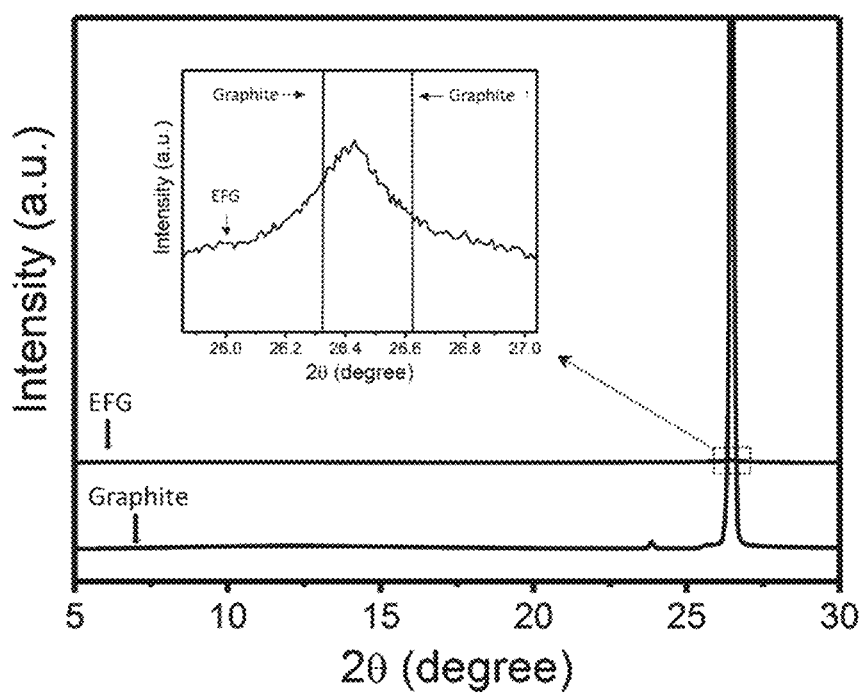
FIG. 6 is a graph comparing the XRD spectra of graphite and EFG. The inset shows the enlarged area as indicated.

The defect of exfoliated graphene was evaluated by its D band and G band in the Raman spectrum. As shown in the FIG. 4A, compared to origin graphite, EFG curve has a symmetrical 2D peak located at 2703 $cm^{-1}$, indicating the presence of the few-layers graphene. The intensity ratio of the D band and G band was used to estimate the defect densities of graphene structure and the $I_D/I_G$=0.60. The G band represents well-defined $sp^2$ hybridized carbon in the graphene flakes and the D refers to the defective graphitic carbon of product. The $I_D/I_G$ ratio is relatively high possibly due to the wide functionalization on the edges of graphene sheet, increasing the amount of disordered carbons. To investigate the oxygen content, XPS spectrum was collected to elucidate the element composition of EFG. High resolution XPS spectra (FIG. 4B) shows a prominent carbon is peak at 284 eV, indicating a majority of C—C bonding in EFG. The XPS survey spectra (FIG. 5) showed that the oxygen content in EFG is around 3.6 at. %. The low amount of oxygen containing further confirms that the functional alkyl chain on the edge of EFG is the main reason for the relatively high $I_D/I_G$ ratio in Raman spectra. Also, X-ray diffraction (XRD) showed a significant peak at 26.4° 2θ degree of pristine graphite power while the EFG XRD spectrum is a flat with a broadened peak around 26° (FIG. 6)

Fabrication and Measurement of Electrically Conductive Polymer Material

Figure 7:
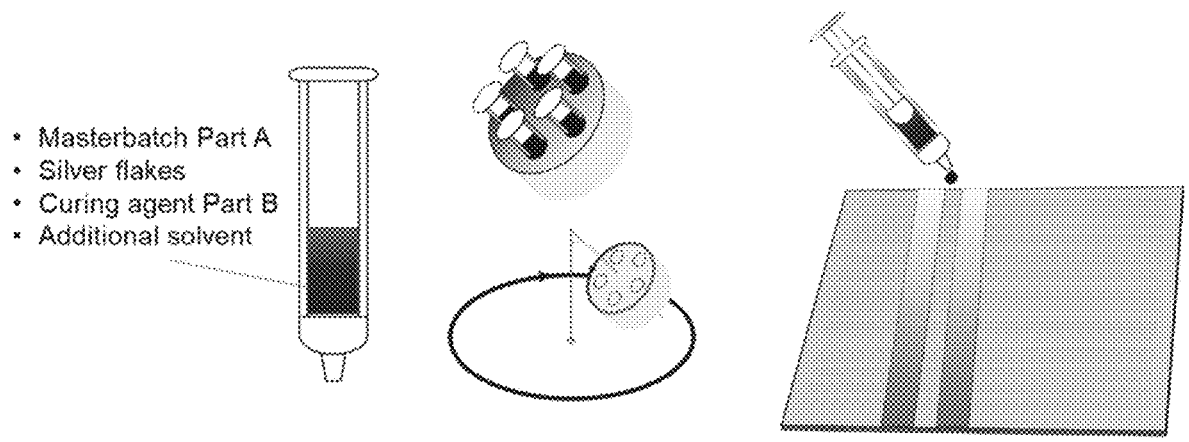
FIG. 7 is a schematic drawing showing ECA mixing in the syringe (left), a syringe adapter (center upper) and mechanism (center lower) of a planetary centrifugal mixer used to make an electrically conductive polymer composite according to one or more embodiments of the present invention, and a percolation testing vehicle (right) for used to test the electrically conductive polymer composites of the present invention.
Figure 8A:
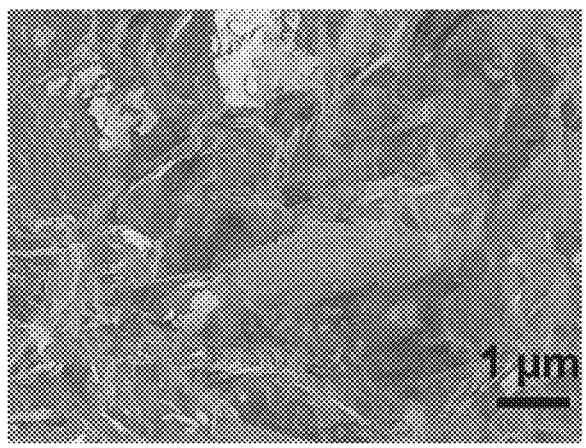
FIGS. 8A-D are SEMs of an EFG/Ag composite according to an embodiment of the present invention under different magnifications (FIGS. 8A-B), and SEM of a MWCNT/Ag composite according to another embodiment of the present invention under different magnifications (FIGS. 8C-D)
Figure 8B:
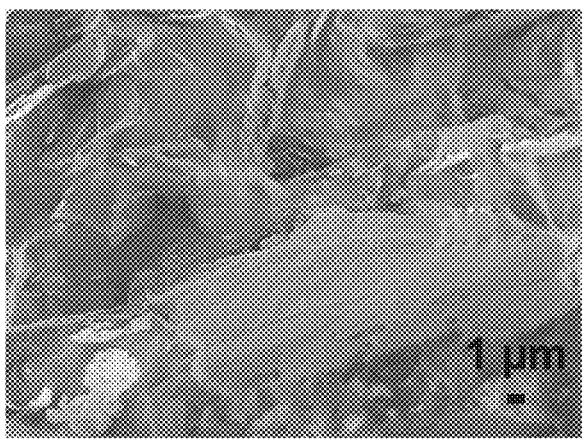
Figure 8C:
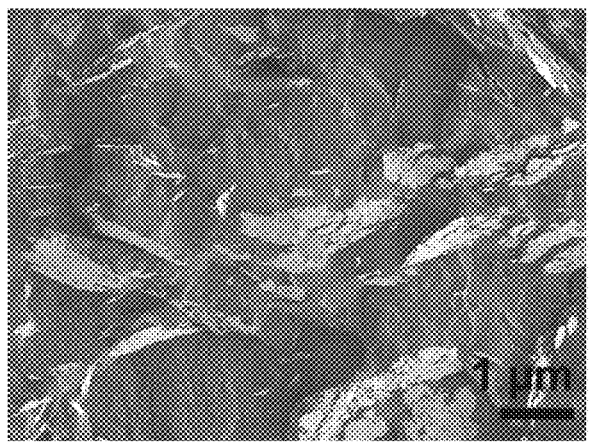
Figure 8D:
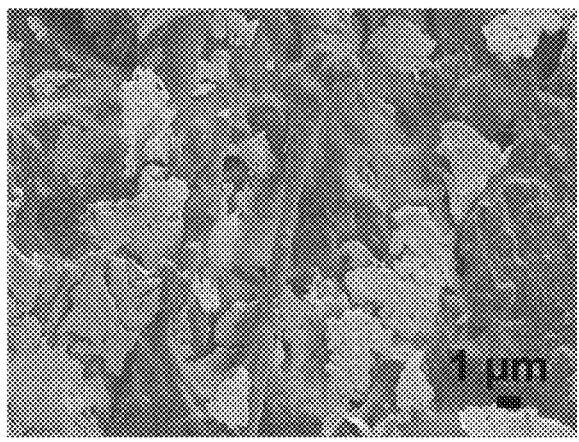

The polymer matrix used was PDMS (Sylgard 184). While the standard ratio of PDMS is 10:1 (base part A:curing agent part B), 8:1 (base part:curing agent part) was used to facilitate the integration of the silver flakes and other filler systems. The reduction of base part content will increase the viscosity of the uncured materials and reduce the crosslinking time required. Before the mixing with silver flakes, masterbatch of the high aspect ratio fillers was prepared. The carbon-based filler material (MWCNT or EFG) was premixed with PDMS part A with help of small amount of chloroform to achieve well-dispersed status. The mixture was dried in the vacuum oven to remove the residue solvent, receiving viscous slurry masterbatch Part A. The masterbatch Part A was then added into syringe in proportion with other components after calculation (FIG. 7 (left)). The multiple filler particles would dramatically increase the viscosity in the syringe and limit the mixing efficiency, small amount of hexane was added to help the dispersion. Five groups of the syringe system were mounted on a specific adapter (FIG. 7 (center upper)) for planetary mixing. The planetary mixer mixed the materials through both self-rotation and revolution to maximize the mixing efficiency (FIG. 7 (center lower)). After 2 cycles of 15 min mixing, the vacuum value was adjusted from 100 kpa to 1 kpa for further rotation in order to evaporate residue solvent, which will produce air bubbles during curing procedure. The distribution of fillers in the composite were characterized by SEM. FIGS. 8A-B show the cross-section of EFG/Ag composite, while FIGS. 8C-D show the cross-section of MWCNT/Ag composite. The brighter flakes represent the silver flakes which were connected by the graphene flakes or carbon nanotubes. The sporadically distributed silver flakes implied that they must be connected with carbon nanomaterials to exhibit conductivity.

To test ECA material, a dimensionally defined testing platform was used. This platform, known as a percolation testing vehicle, was fabricated using an epoxy glass fiber board with printed gold strips surmounting the surface as shown in FIG. 7 (right). To cast an ECA material, two strips of ~400 μm thick copper tape was adhered to the surface, perpendicular to the direction of the underlying gold strips. The strips were accurately premeasured to ensure a proper parallel between the strips. ECA material was them delivered to one edge of the board, between the two copper-tape strips, and a razor blade was used as a doctor blade in spreading the ECA uniformly within the copper tape gap. Excess ECA was then removed from either side of the strip that did not lie within the gap. The board was then placed in a laboratory thermal oven at 100° C. for 2 hours. The temperature selected to ensure the film to be cured without any generated bubbles. After removing covering copper tapes, the resistances between metal strips were collected to calculate the electrical conductivity.

Figure 9A:
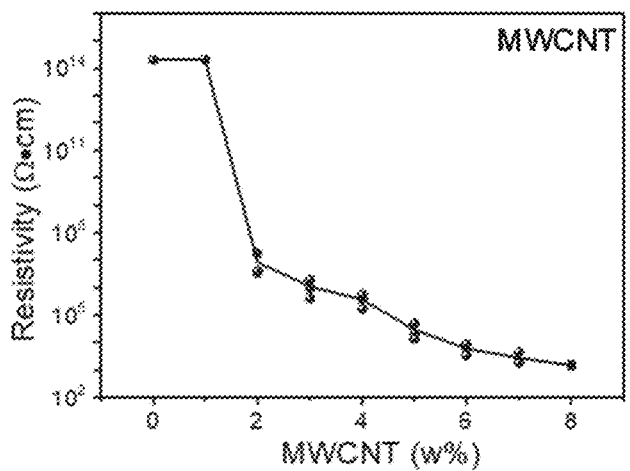
FIGS. 9A-E are graphs showing the resistivities of single filler and two filler composite materials and, more specifically, graphs showing a single filler composite materials using MWCNT (FIG. 9A), single filler composite materials using EFG (FIG. 9B), single filler composite materials using silver (FIG. 9C), two filler composite materials using MWCNT/Ag with 7 w % of MWCNT (FIG. 9D), and two filler composite materials using EFG/Ag with 8 w % EFG (FIG. 9E)
Figure 9B:
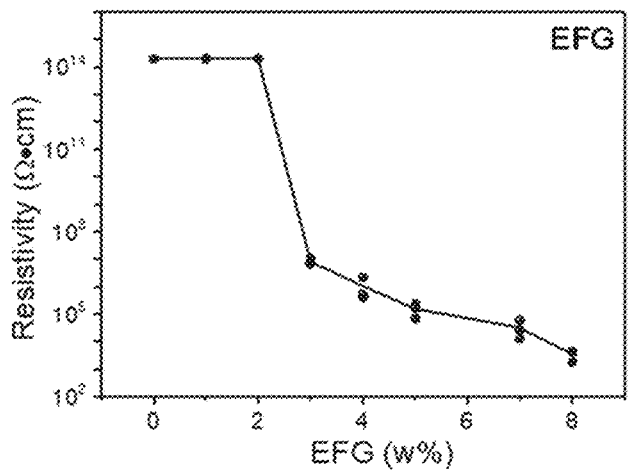
Figure 9C:
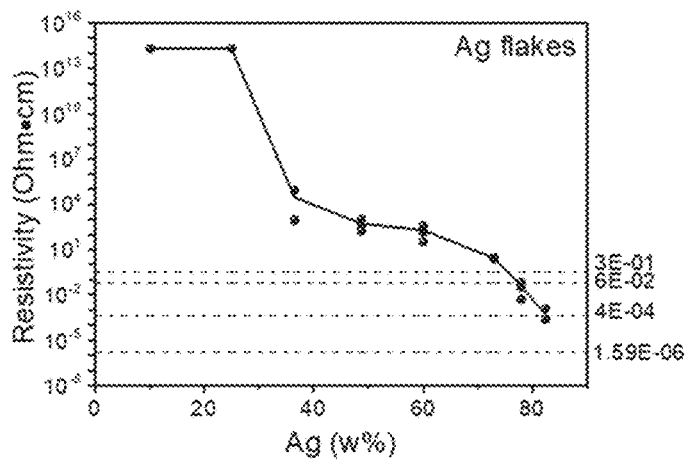

Single filler ECA was evaluated before the multi-filler ECA were prepared. As silver flake is widely used in commercial ECA materials as conductive filler, it was evaluated together with high aspect ratio carbon-based filler materials. The resistivities of various samples are measured and presented as dots and the average resistivities are drawn as lines in FIGS. 9A-E. As shown in FIG. 9A, silver flakes were mixed with PDMS with different weight percentage. The pristine PDMS was not conductive and resistivity of sliver composite became measurable when the silver concentration reached 36.5 w % (or 5 v %). With the increase of silver flake concentration, ECA became more conductive and reached lowest resistivity of $2.5 \times 10^{-4}$ ohm·cm with 82.4 w % (30 v %) of silver. This represented the conductivity of 4000 S/cm. As for the MWCNT and EFG fillers, the results are shown in FIGS. 9B-C. The MWCNT composite became conductive at 2 w %. The resistivity of the material decreased with the increase of filler loading and reached lowest resistivity of $1.85 \times 10^3$ ohm·cm at 7 w % filler loading and $1.43 \times 10^3$ ohm·cm at 8 w % filler loading. For the EFG composite, it possesses similar trend as MWCNT composite. The EFG composite became conductive at ~3 w % filler loading and reached lowest resistivity of $1.81 \times 10^3$ ohm·cm at 8 w % filler loading. Base on the single filler ECA results, the 7 w % MWCNT or 8 w % EFENG filler loading were chosen to prepare masterbatch Part A.

Figure 9D:
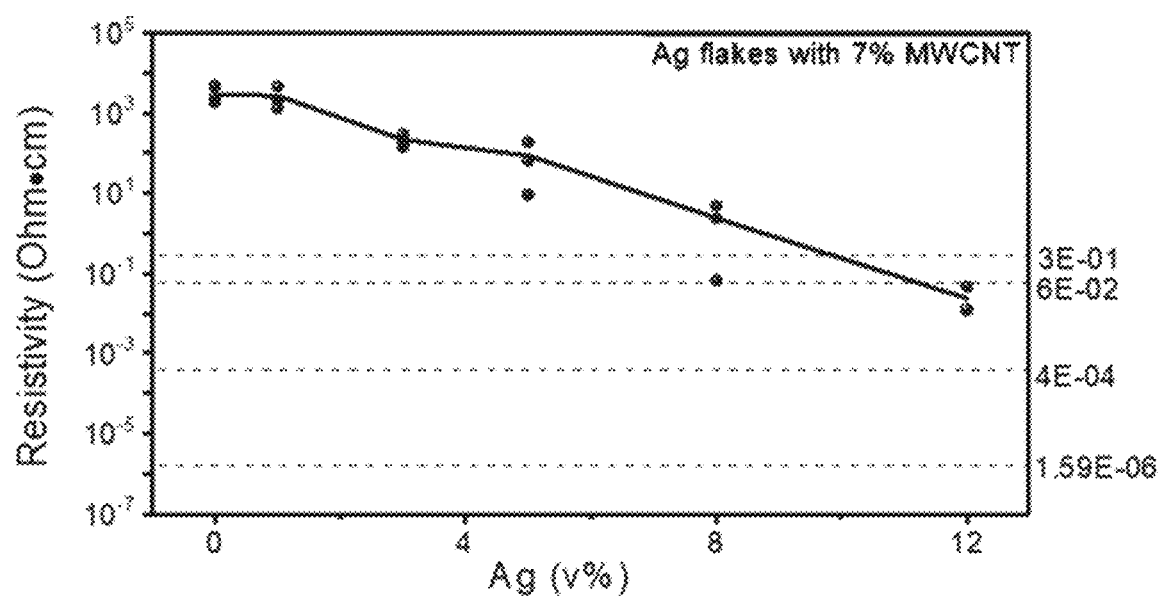
Figure 9E:
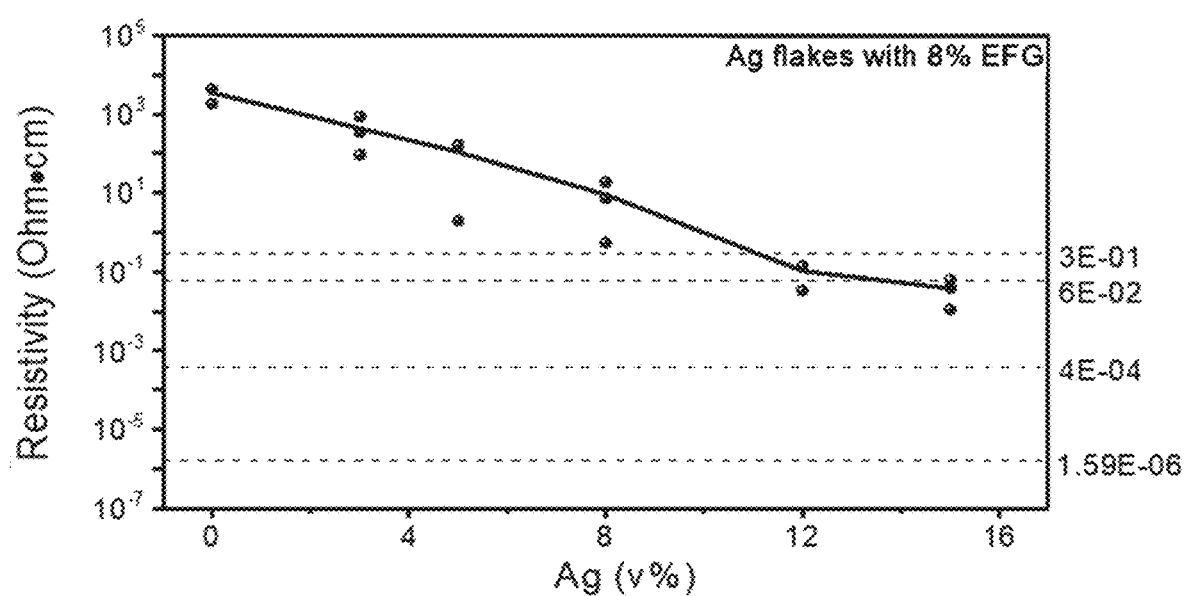
Figure 10:
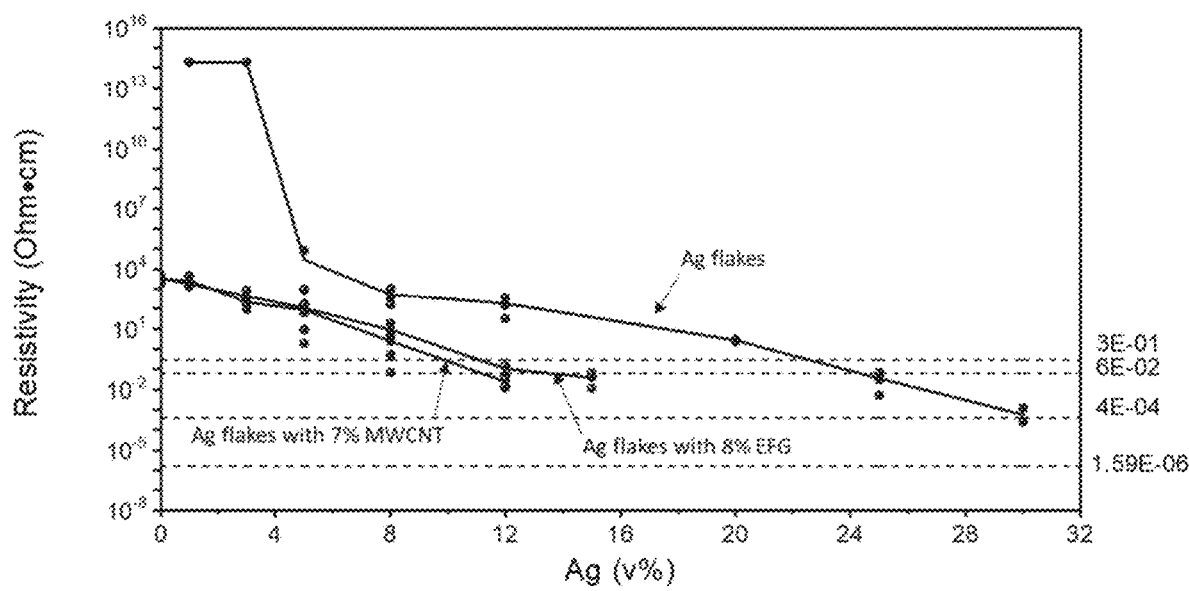
FIG. 10 is a graph comparing the resistivities of different single filler composite and two filler composites and include reference lines that are the theoretical resistivities of graphite perpendicular to graphene planes ($3.0 \times 10^{-1}$ ohm·cm), along to the graphene planes ($4.0 \times 10^{-4}$ ohm·cm), resistivity of typical carbon materials ($6.0 \times 10^{-2}$ ohm·cm) and theoretical resistivity of silver: ($6 = 1.6 \times 10^{-6}$ ohm·cm).

Composite material with mixed filler were prepared based on the procedures discussed in the previous section, their conductivities/resistivities were measured with different amount of silver loading. The results are shown in FIGS. 9D-E and 10. FIG. 9D is 7 w % MWCNT masterbatch loaded with different amount of silver flakes. The resistivity reached $1.20 \times 10^{-2}$ ohm·cm (83.3 S/cm) when the silver flake loading is 12 v %. In FIG. 9E, the resistivity of the samples was $1.12 \times 10^{-2}$ ohm·cm (89.3 S/cm) with 15 v % silver flakes in 8 w % EFG masterbatch.

The multifiller composite results were compared with single filler silver composite in FIG. 10. The multifiller systems were advantageous when at low silver loadings. For instance, the resistivities of the multifiller materials are 3~4 orders of magnitude lower than the single silver filler materials when the silver loading is 12 v %. Similar resistivities were achieved by silver filler loading of ~25 v % in single silver filler materials. This result indicated the addition of low-cost, high aspect ratio carbon-based filler materials can significantly reduce the silver loading in ECA, potentially reducing the cost of the materials. Several reference lines are plotted on FIG. 10 as well: the theoretical resistivities of graphite perpendicular to graphene planes ($3.0 \times 10^{-1}$ ohm·cm), along to the graphene planes ($4.0 \times 10^{-4}$ ohm·cm) and theoretical resistivity of silver: ($6=1.6 \times 10^{-6}$ ohm·cm). The two filler EFG/Ag composite or MWCNT/Ag composite already provided higher conductivity than the randomly packed carbon materials ($6.0 \times 10^{-2}$ ohm·cm). It also believed that these materials have potential to reach higher conductivities than the theoretical value of graphite, with low silver loading. This could be explained by a synergistic effect of the two fillers, with the high aspect ratio carbon-based filler materials percolated the composites and high conductivity silver flaker filler providing improved conductivity.

CONCLUSION

As discussed above, exfoliated functionalized graphene filler materials have been formed via NaK alloy exfoliation. The exfoliated functional graphene possesses high aspect ratio and dispersibility in the solution with less defect carbon (3.6 at. % oxygen content). To make the ECA material achieve the similar conductivity with graphite power, double fillers system ECA materials were manufactured using a decreased silver volume (from 25 v % to 12v %) and carbon nanofillers (EFENG and MWCNT), significantly reducing the amount of silver consumed and lowering the cost of electrically conductive polymer composition. With adding 7 wt % of MWCNT, the electrically conductive polymer composition can reach 40.7 S/cm at 12v % while adding 8 wt % of EFENG the ECA can reach 26.3 S/cm at 15v %. These results indicate that it is possible to use the multiple dimensional fillers described above to reach a lower percolation threshold value and achieve higher conductivity.

EXAMPLES

The following examples are offered to more fully illustrate the invention but are not to be construed as limiting the scope thereof. Further, while some of examples may include conclusions about the way the invention may function, the inventor does not intend to be bound by those conclusions but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Materials

Baytubes® C 150 HP Multi-walled Carbon Nanotubes (>99% C-purity, ~13 nm outer mean diameter, ~4 nm inner mean diameter, >1 μm length, 140-230 kg/m³ bulk density) were kindly provided by Bayer Material Science. Synthetic graphite powder (99.9% metal basis, –10 mesh) was purchased from Alfa Aesar. Silver (Ag) Flake (99.95% metal basis, 5-8 μm) was purchased from Inframat® Advanced Materials™. Silicone Elastomer (Sylgard 184) was purchased from Dow Corning. Sulfuric Acid (98%, ACS Certified) was purchased from Fischer Chemical. Nitric acid (70%, ACS reagent) was purchased from Sigma-Aldrich. Argon gas cylinder and hydrogen gas cylinder were purchased from Praxair. Sodium sticks (99%, immersed in protective hydrocarbon oil) was purchased from Alfa Aesar. Potassium chunks (98%, immersed in mineral oil) was purchased from Acros Organics. Dimethoxyethane (99%, Extra Dry, AcroSeal™) was purchased from Acros Organics. 1-Iodohexane was purchased from Sigma-Aldrich. Isopropanol (ACS Grade), Acetone (ACS Certified), Ethyl Acetate (ACS Certified), Chloroform (ACS Grade), Methanol (ACS Certified), and Hexanes (mixture of isomers) were purchased from Fischer Chemical. Ethanol (200 proof) was purchased from Decon Labs. 1,2,4-Trichlorobenzene was purchased from Sigma-Aldrich.

Characterization

Raman Spectroscopy was utilized to detect quality of graphene sheets produced by the synthesis process listed here-in. The machine used was a HORIBA LabRAM HR Raman Spectroscope. The wavelength of excitation laser is 532 nm. SEM was used to observe size, thickness, morphology, and electron diffraction patterns of the synthesized EFGNP. The SEM used was a JEOL JSM-7401F operated at 10 kV. The TEM used was a JEOL JSM-1230 Field Emission Scanning Electron Microscope operated at 120 kV. XRD was utilized to detect the crystalline structure change of the exfoliated graphite through graphite powder.

Example 1

Fabrication and Testing of ECA Using Silver Flakes and MWCNTs or EFG

Synthesis of EFG 10 g of natural graphite flakes was collected, weighed, and added to a 500 mL sealable container. 100 mL of a mixture of 9:1 sulfuric acid to nitric acid was added to the container and allowed to sit with minimal agitation for 24 hours. The supernatant was carefully decanted into a large water reservoir before being disposed. The remaining solid was washed and neutralized with external water. The acid-washed flakes were collected and dried in a vacuum oven overnight. Portions of the acid-washed graphite were then transferred into a small transfer tube to be hot-loaded into a Thermo Scientific Lindberg Blue M tube furnace at 850° C. in an argon until visible vapor production ceased. After forming warm-like structure, the expanded graphite was then allowed to cool before being removed and collected.

To 400 mg of expanded graphite, 40 mL of chlorosulphonic acid was added in a 100 mL sealable glass container and allowed to stir overnight at room temperature. The container was then chilled at 0° C. before being carefully poured, dropwise, over a large reservoir of ice. Once fully quenched, the resulting water/ice with acid-washed expanded graphite is filtered using a Buchner funnel with aspirated reduced-pressure. The powder is fully washed with deionized water before being collected and dried in the vacuum oven. Portions of the acid-washed expanded graphite were then transferred into a small transfer tube to be hot-loaded into a Thermo Scientific Lindberg Blue M tube furnace at 600° C. in an argon and hydrogen atmosphere for 20 minutes. The expanded graphite was then allowed to cool before being removed and collected.

For the final exfoliation step, an electrochemical intercalation approach was employed which uses Sodium-Potassium liquid alloy (NaK). In preparation, NaK intercalant was prepared using 77/23 weight ratio of potassium to sodium to reach the room temperature liquid-alloy eutectic point. This preparation was performed by adding the corresponding weight ratio amounts of sodium and potassium to a vial within an argon glovebox to equal ~1 g total weight. The vial was then vortexed until a metallic liquid was formed with no visible solid remaining. To a 250 mL round-bottom flask, 500 mg of chlorosulphonic acid expanded graphite was added with magnetic stir bar and the container was then sealed by rubber septum. Then, 35 mL of dry 1,2-dimethoxyethane was added via 20 mL syringe, followed by 0.4 mL of NaK via separate 1 mL syringe. The flask was then septum sealed and removed from the argon glovebox. The flask was then sonicated by a UCE Ultrasonic Bath Cleaner (400 W, 40 kHz) until dark blue solution appears in the flask. The solution was then allowed to stir for 24 hours, after adding the 1.2 mL of 1-iodohexane. The solution was then allowed to stir for another 24 hours before being quenched with 20 mL of methanol. The final edge-functionalized graphene product was then filtered through a 0.45 μm PTFE filter, eluting with DI water and organic solution and drying in the vacuum oven. The powder product was stored in chloroform with 20 mg/ml concentration.

Example 2

Fabrication of ECA

The ECA matrix used was PDMS (Sylgard 184). While the standard ratio of PDMS is 10:1 (base part A: curing agent part B), a ratio of 8:1 (base part: curing agent part) was instead used to facilitate the integration of the silver flakes and other filler systems. Before the mixing with silver flakes, masterbatch of the high aspect ratio fillers was prepared. The carbon filler (MWCNT or EFG) was pre-mixed with PDMS part A with help of small amount of chloroform to achieve well-dispersed status. The mixture was dried in the vacuum oven to remove the residue solvent, receiving viscous slurry masterbatch Part A. The masterbatch Part A was then added into syringe in proportion with other components after calculation. The multiple filler particles would dramatically increase the viscosity in the syringe and limit the mixing efficiency, small amount of hexane was added to help the dispersion. Five groups of the syringe system were mounted on a specific adapter for planetary mixing. The planetary mixer mixed the materials through both self-rotation and revolution to maximize the mixing efficiency. After 2 cycles of 15 min mixing, the vacuum value was adjusted from 100 kpa to 1 kpa for further rotation to evaporate residue solvent, which will produce air bubbles during curing procedure. The distribution of fillers in the composite were characterized by SEM.

Example 3

Evaluating the Conductivity of ECA

To cast an ECA material, two strips of 400 μm thick copper tape was adhered to the surface of percolation testing vehicle, perpendicular to the direction of the underlying gold strips. The strips were accurately premeasured to ensure a proper parallel between the strips. ECA material was them delivered to one edge of the board, between the two copper-tape strips, and a razor blade was used as a doctor blade in spreading the ECA uniformly within the copper tape gap. Excess ECA was then removed from either side of the strip that did not lie within the gap. The board was then placed in a laboratory oven at 100° C. overnight. Once cured, the two copper strips were removed to reveal a singular ECA strip surmounting the gold strips perpendicularly. The dimensions of the strip were measured using calipers (for width) and a thickness gauge (for thickness); along with known gold-strip gap lengths (length), this allowed for a reliable testing box for resistivity and conductivity elucidation.

Above relatively high filler volume loading (>10 vol. %) the ECA became both viscous and highly conductive, disqualifying the use of small and thin casting. Thus, a larger dimensionally defined box was fabricated. This vehicle was composed of a glass base slide which was surmounted by four smaller glass rectangles; so mounted that a cuboid shape was developed. The glass pieces were mounted with Kapton, carefully avoiding exposure to the inner fill-space. Two opposing-sided glass strips were covered with copper tape as to include inner-facing exposed copper surfaces to contact the ECA once filled and allow for pads for external testing. The dimensions of the cuboid cell were measured using calipers and the defined thickness of the glass slides (1 mm thick). The ECA filled space provided enough resistive load to reliably test within the calibration of the multimeter used. The multimeter used for both test vehicles was a Keithley 2000 Series digital multimeter. The results are shown in FIGS. 9A-F and 10 above.

In light of the foregoing, it should be appreciated that the present invention significantly advances the art by providing an electrically conductive polymer composition that is structurally and functionally improved in several ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An electrically conductive polymer composition comprising:
    at least one conductive metal filler material comprising a plurality of metal particles having a first aspect ratio;
    at least one carbon-based filler material selected from the group consisting of edge-functionalized graphene, exfoliated natural graphene, edge-functionalized exfoliated natural graphite, and combinations thereof having a size in a shortest dimension of from about 0.3 nm to about 50 nm and a second aspect ratio wherein said second aspect ratio is from more than 10,000 to about $10^8$; and
    a polymer matrix;
    wherein said second aspect ratio is at least ten times greater than said first aspect ratio.

2. The electrically conductive polymer composition of claim 1 wherein the difference between said first aspect ratio and said second aspect ratio is from about 10 to about $1 \times 10^8$.

3. The electrically conductive polymer composition of claim 1 wherein the difference between said first aspect ratio and said second aspect ratio is from about 10,000 to about $1 \times 10^8$.

4. The electrically conductive polymer composition of claim 1 wherein said conductive metal filler material comprises a metal selected from the group consisting of silver, silver flakes, copper, aluminum, silver coated metal, silver coated nickel, silver coated copper, silver coated aluminum, and combinations thereof.

5. The electrically conductive polymer composition of claim 1 wherein said conductive metal filler material comprises silver flakes.

6. The electrically conductive polymer composition of claim 1 wherein said first aspect ratio is from about 1 to about 10.

7. The electrically conductive polymer composition of claim 1 wherein the mean particle size of said conductive metal filler material is from about 1 μm to about 1000 μm.

8. The electrically conductive polymer composition of claim 1 wherein said carbon-based filler material is less than 50 nanometers long in at least one dimension.

9. The electrically conductive polymer composition of claim 1 wherein said polymer matrix comprises a substantially non-conductive polymer selected from the group consisting of polydimethylsiloxane, epoxy, polyacrylates, polymethacrylates, polyurethanes, and combinations thereof.

10. The electrically conductive polymer composition of claim 1 wherein said polymer matrix comprises polydimethylsiloxane.

11. The electrically conductive polymer composition of claim 1 wherein the carbon-based filler material has a percolation threshold of from about 0.001% to about 2%.

12. The electrically conductive polymer composition of claim 11 wherein the carbon-based filler material has a percolation threshold of less than 0.1%.

13. The electrically conductive polymer composition of claim 1 wherein said conductive metal filler material comprises less than about 16% percent of said electrically conductive polymer by volume.

14. A method of forming the electrically conductive polymer composition of claim 1 comprising:
   A) preparing or obtaining at least one conductive metal filler material comprising a plurality of metal particles having a first aspect ratio;
   B) preparing or obtaining at least one carbon-based filler material selected from the group consisting of edge-functionalized graphene, exfoliated natural graphene, edge-functionalized exfoliated natural graphite, and combinations thereof, said carbon-based filler material having a second aspect ratio, wherein said second aspect ratio is at least ten times greater than said first aspect ratio;
   C) preparing or obtaining a substantially non-conductive polymer, said substantially non-conductive polymer comprising a polymer base;
   D) combining said carbon-based filler material and said polymer base and mixing to distribute said carbon-based filler material throughout said polymer base;
   E) adding said conductive metal filler material having to the mixture of step D, wherein said conductive metal filler material comprises less than 15% of the total volume of the mixture;
   F) mixing to distribute said carbon-based filler material throughout said polymer base; and
   G) curing the mixture to produce the electrically conductive polymer composition of claim 1.

15. The method of claim 14 further comprising:
   H) adding a quantity of solvent to the mixture of step E to facilitate distribution of the carbon-based filler material throughout said polymer base; and
   I) removing said solvent by evaporation.

16. The method of claim 14 wherein the step of adding said conductive metal filler material (step E) further comprises adding a curing agent for said polymer base to the mixture of claim D.

17. The method of claim 14 wherein said conductive metal filler material comprises particles of a conductive metal selected from the group consisting of silver, silver flakes, copper, aluminum, silver coated metal, silver coated nickel, silver coated copper, silver coated aluminum, and combinations thereof.

18. The method of claim 14 wherein said carbon-based filler material is edge-functionalized exfoliated natural graphite.

19. The method of claim 14 wherein said substantially non-conductive polymer is selected from the group consisting of polydimethylsiloxane, epoxies, polyacrylates, polymethacrylates, polyurethanes, and combinations thereof.

20. The method of claim 14 wherein the step of mixing to distribute said carbon-based filler material throughout said polymer base is performed using a planetary mixer.

21. An electrically conductive polymer comprising:
   from about 5 vol % to about 15 vol % of at least one conductive metal filler material comprising silver flakes having a first aspect ratio of from about 1 to about 10 and a particle size of from about 1 µm to about 1000 µm;
   from about 0.001 wt % to about 8 wt % of one or more carbon-based filler material comprising at least one of multi-walled carbon nanotubes having a second aspect ratio of from more than 10,000 to about $10^8$ and a particle size in a shortest dimension of from about 1 to about 50 nm and an edge-functionalized exfoliated natural graphite having a third aspect ratio of from more than 10,000 to about $10^8$ and a particle size in a shortest dimension of from about 0.3 nm to about 20 nm; and
   from about 75 vol % to about 95 vol % of a polymer matrix selected from the group consisting of polydimethylsiloxane, epoxies, polyacrylates, polymethacrylates, polyurethanes, and combinations thereof;
   wherein said conductive metal filler material comprising silver flakes and said at least one of multi-walled carbon nanotubes or edge-functionalized exfoliated natural graphite are homogeneously distributed throughout said polymer matrix, and
   wherein said second or third aspect ratio is at least 10 times larger than said first aspect ratio.

* * * * *